(12) United States Patent
Li et al.

(10) Patent No.: US 11,235,721 B2
(45) Date of Patent: Feb. 1, 2022

(54) FRONT PROTECTION DEVICES AND VEHICLES

(71) Applicant: WINBO-DONGJIAN AUTOMOTIVE TECHNOLOGY CO., LTD., Foshan (CN)

(72) Inventors: Jinfeng Li, Foshan (CN); Changbiao Chen, Foshan (CN); Guodong Luo, Foshan (CN); Jie Yang, Foshan (CN)

(73) Assignee: WINBO-DONGJIAN AUTOMOTIVE TECHNOLOGY CO., LTD., Foshan (CN)

(*) Notice: Subject to any disclaimer, the term of this patent is extended or adjusted under 35 U.S.C. 154(b) by 0 days.

(21) Appl. No.: 16/930,619

(22) Filed: Jul. 16, 2020

(65) Prior Publication Data

US 2021/0309172 A1   Oct. 7, 2021

(30) Foreign Application Priority Data

Apr. 1, 2020   (CN) .......................... 202010250836.2

(51) Int. Cl.
*B60R 19/14* (2006.01)
*B60R 19/24* (2006.01)
*B60R 19/04* (2006.01)
*B60R 19/50* (2006.01)

(52) U.S. Cl.
CPC .............. *B60R 19/14* (2013.01); *B60R 19/04* (2013.01); *B60R 19/24* (2013.01); *B60R 19/50* (2013.01); *B60R 2019/247* (2013.01); *B60R 2019/505* (2013.01)

(58) Field of Classification Search
CPC ............................... B60R 19/14; B60R 19/04
USPC .................................................. 293/149, 150
See application file for complete search history.

(56) References Cited

U.S. PATENT DOCUMENTS

| | | | | |
|---|---|---|---|---|
| 3,843,180 A | * | 10/1974 | Alexander | B60R 19/14 293/150 |
| 3,884,517 A | * | 5/1975 | Davidson | B60R 19/04 293/150 |
| 3,907,352 A | * | 9/1975 | Spain | B60R 19/04 293/152 |
| 4,130,312 A | * | 12/1978 | Cooper, Sr. | B60R 19/04 293/153 |
| 4,266,818 A | * | 5/1981 | Hightower | B60R 19/14 188/371 |
| 5,000,499 A | * | 3/1991 | Shephard | B60R 19/14 188/376 |
| 5,833,283 A | * | 11/1998 | Shaw | B60R 19/50 293/117 |
| 2004/0183318 A1 | * | 9/2004 | Bird | B60R 19/38 293/149 |
| 2006/0197347 A1 | * | 9/2006 | Hoffman | B60R 19/56 293/102 |

(Continued)

FOREIGN PATENT DOCUMENTS

KR   1564948 B1 * 11/2015

*Primary Examiner* — Jason S Morrow
(74) *Attorney, Agent, or Firm* — Seyfarth Shaw LLP

(57) ABSTRACT

A front protection device for a vehicle includes an intermediate body and two fenders. The two fenders are detachably mounted at two ends of the intermediate body, respectively. A first gap is formed between each of the fenders and an outer surface of the intermediate body. The outer surface of the intermediate body refers to a surface of the intermediate body away from a vehicle body.

9 Claims, 7 Drawing Sheets

(56) References Cited

U.S. PATENT DOCUMENTS

| | | | |
|---|---|---|---|
| 2006/0249961 A1* | 11/2006 | Flotzinger | B60R 19/04 293/115 |
| 2008/0203744 A1* | 8/2008 | Fortin | B60R 19/18 293/124 |
| 2012/0049545 A1* | 3/2012 | Davis | B60R 19/52 293/115 |
| 2015/0084322 A1* | 3/2015 | Killian | B60R 19/14 280/784 |
| 2017/0088076 A1* | 3/2017 | Fujimoto | B60R 19/04 |
| 2017/0144619 A1* | 5/2017 | Shamoto | B60R 19/023 |

* cited by examiner

FRONT PROTECTION DEVICES AND VEHICLES

CROSS-REFERENCE TO RELATED APPLICATION

This application claims the benefit of Chinese Patent Application No. 2020102508362, filed on Apr. 1, 2020, the entire content of which is incorporated herein in its entirety.

TECHNICAL FIELD

The present disclosure relates to the technical field of vehicles, in particular, to a front protection device and a vehicle.

BACKGROUND

A front protection device of a vehicle is an accessory mounted at the front of the vehicle, which is mainly used to absorb and damp external impact forces, protect the safety of the front of a vehicle body, and reduce the injuries suffered by passengers in the vehicle during a collision. At present, the current front protection devices of vehicles are mainly made of plastics and sheet metal parts, and the entire front protection device has a large volume, which leads to difficulty in product transportation, high cost, and insufficient protection of the structure.

SUMMARY

According to various embodiments of the present disclosure, a front protection device and a vehicle including the same are provided.

A front protection device includes an intermediate body and two fenders. The two fenders are detachably mounted at two ends of the intermediate body, respectively. A first gap is formed between each of the fenders and an outer surface of the intermediate body. The outer surface of the intermediate body refers to a surface of the intermediate body away from a vehicle body.

A vehicle is further provided, which includes a vehicle body and the aforementioned front protection device. The front protection device is disposed on a head of the vehicle body.

The above and other features of the present disclosure including various novel details of construction and combinations of parts, and other advantages, will now be more particularly described with reference to the accompanying drawings and pointed out in the claims.

BRIEF DESCRIPTION OF THE DRAWINGS

The drawings forming a part of this disclosure are used to provide a further understanding of the present disclosure. Schematic embodiments and descriptions thereof in the present disclosure are used to explain the present disclosure and do not form an undue limitation on the present disclosure.

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
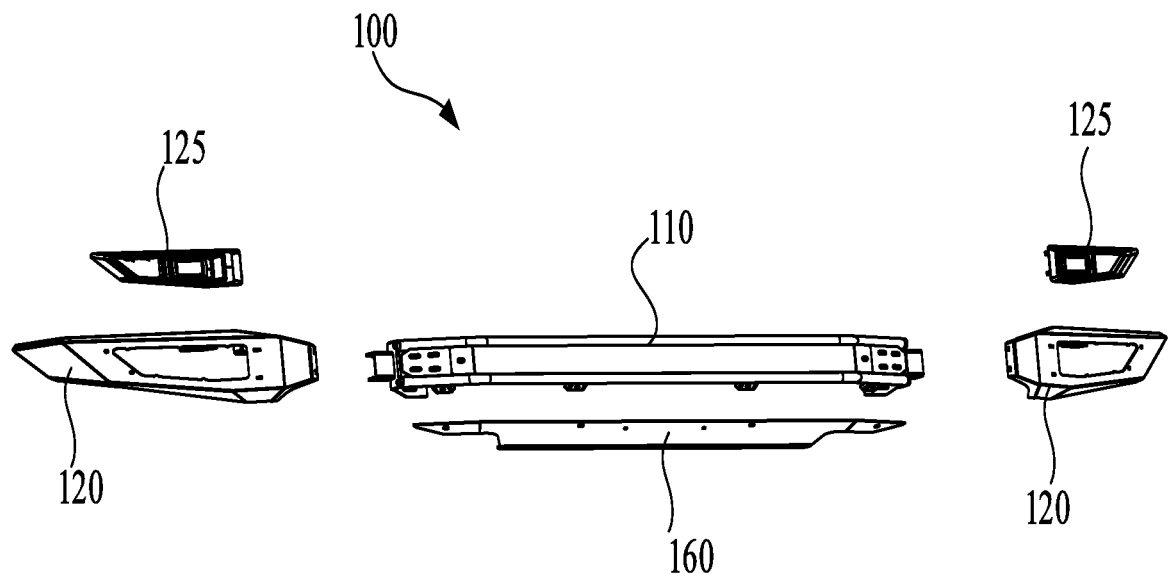
FIG. 1 is an exploded schematic view of a front protection device according to an embodiment of the present disclosure.

In order to make the above objects, features and advantages of the present disclosure more obvious and understandable, the specific embodiments of the present disclosure will be illustrated in detail below in conjunctions with the accompanying drawings. In the following description, many specific details are set forth in order to assist readers in fully understanding the present disclosure. However, the present disclosure can be implemented in many other ways than described herein, and those skilled in the art can make similar improvements without departing from the connotation of the present disclosure. Therefore, the present disclosure is not limited by the specific embodiments disclosed below.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features described. Thus, the features defined with "first" and "second" may include at least one of the features explicitly or implicitly. In the description of the present disclosure, the meaning of "plurality" is at least two, such as two, three, etc., unless explicitly defined otherwise.

In the present disclosure, unless explicitly specified and limited otherwise, the terms "mounting", "connecting", "connected", "fixed" and the like should be understood in a broad sense. For example, it may be a fixed connection or a detachable connection, or an integration, may be a mechanical connection or electrical connection, may be a direct connection, or may be an indirect connection through an intermediate medium, may be the connection between two elements or the interaction relationship between two elements, unless explicitly defined otherwise. The specific meanings of the above terms in the present disclosure can be understood by one of those ordinary skills in the art according to specific circumstances.

In the present disclosure, unless explicitly specified and limited otherwise, the first feature being "on" or "below" the second feature may be that the first and second features are in a direct contact, or the first and second features are in an indirectly contact through an intermediate medium. Moreover, the first feature being "over", "above" and "on" the second feature may be that the first feature is directly above or obliquely above the second feature, or simply means that the first feature is higher than the second feature in horizontal direction. The first feature being "beneath", "under", and "below" the second feature may be that the first feature is directly below or obliquely below the second feature, or simply means that the first feature is lower than the second feature in horizontal direction.

It should be noted that when an element is referred to as being "fixed" or "provided on" another element, it may be directly on another element or there may also be an intermediate element therebetween. When an element is considered to be "connected" to another element, it may be directly connected to another element or there may be an intermediate element therebetween. As used herein, the terms "vertical", "horizontal", "upper", "lower", "left", "right", and similar expressions are for illustration only and are not meant to be the only embodiments.

In one aspect of the present disclosure, a front protection device 100 is provided, which can include, but is not limited to, an intermediate body 110 and two fenders 120. The two fenders 120 are detachably mounted at two ends of the intermediate body 110, respectively. A first gap 130 is formed between each of the fenders 120 and an outer surface of the intermediate body 110. The outer surface of the intermediate body 110 refers to a surface of the intermediate body 110 away from a vehicle body.

In one of the embodiments, each of the fenders 120 is provided with a first connecting portion 121 rotatably connected to an end of the intermediate body 110. Each of the fenders 120 rotates about the first connecting portion 121 as an axis, so that each of the fenders 120 is in a folded position or in an unfolded position relative to the intermediate body 110. The folded position refers to a position where the fenders 120 are attached to an inner surface of the intermediate body 110, and the inner surface of the intermediate body 110 refers to a surface of the intermediate body 110 facing the vehicle body. The unfolded position refers to a position where the fenders 120 adjoin the intermediate body 110 to form the front protection device 100 that can be mounted on the vehicle body.

In one of the embodiments, each of the fenders 120 is provided with an engagement portion 122 at an end thereof. The engagement portion 122 is engaged to an edge of the intermediate body 110 when each of the fenders 120 rotates to the unfolded position.

In one of the embodiments, the front protection device 100 further includes first fasteners 140. The fenders 120 are mounted to the intermediate body 110 through the first fasteners 140.

In one of the embodiments, the front protection device 100 further includes auxiliary mounting members 150 detachably mounted on the intermediate body 110. The fenders 120 are detachably connected to the auxiliary mounting members 150. Each of the auxiliary mounting members 150 is a bending metal sheet structure, and includes a first bending portion 151 and a second bending portion 152. The first bending portion 151 is threadedly connected to each of the fenders 120, and the second bending portion 152 is threadedly connected to the intermediate body 110.

In one of the embodiments, the front protection device 100 further includes a lower guard plate 160 detachably mounted on the intermediate body 110. The lower guard plate 160 has a first area 161 configured to provide a mark. The mark is one or a combination of patterns, letters, and words.

In one of the embodiments, the front protection device 100 is further provided with decorating members 125 detachably mounted on the fenders 120. Edges of the decorating members 125 are provided with quick snap locks 190. The quick snap locks 190 are locked on the fenders 120.

In one of the embodiments, the front protection device 100 is further provided with lampshades 170. Each of the lampshades 170 is provided with a second area 171 for providing a mark. Each of the fenders 120 is provided with a first opening 124. The second area 171 is disposed in the first opening 124. The second area 171 is weakly connected to an inner wall forming the first opening 124.

In one of the embodiments, shapes of the intermediate body 110 and the fenders 120 are matched with a vehicle body. The intermediate body 110 and the fenders 120 are provided with a plurality of mesh holes 180.

In another aspect of the present disclosure, a vehicle including the vehicle body and the front protection device 100 as described in any one of the aforementioned embodiments is provided. The front protection device is disposed on a head of the vehicle body.

The present embodiment provides a front protection device 100 and a vehicle, which have the advantages of improving the buffering and energy absorption effects of the front protection device 100, and reducing transportation costs, and facilitating replacement of damaged parts, and which will be described in detail below with reference to the accompanying drawings.

Figure 2:
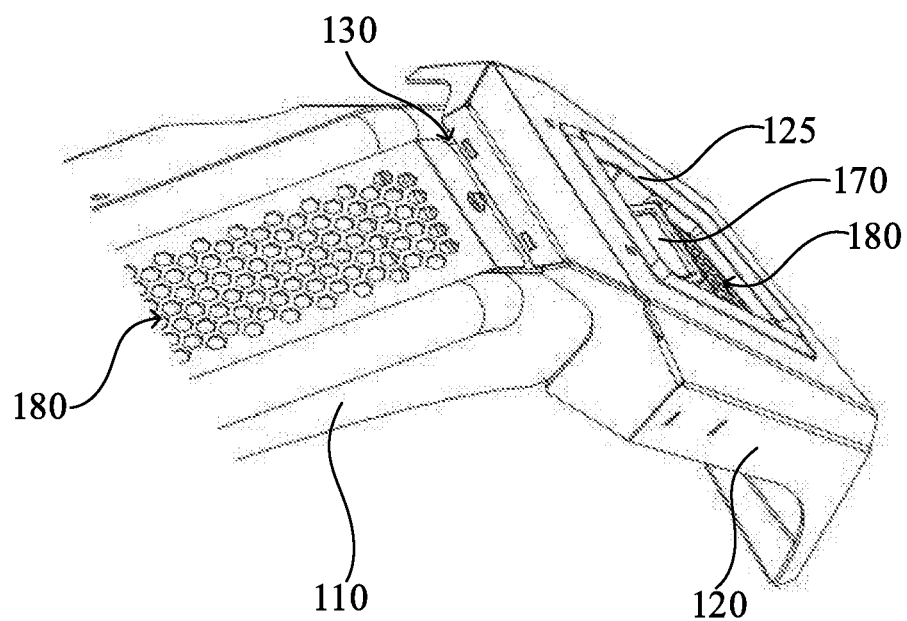
FIG. 2 is a schematic view of a connection of an intermediate body and a fender according to an embodiment of the present disclosure.

In one embodiment, referring to FIGS. 1 to 2, a front protection device 100 includes an intermediate body 110 and two fenders 120. The two fenders 120 are detachably mounted at two ends of the intermediate body 110, respectively. A first gap 130 is formed between each of the fenders 120 and an outer surface of the intermediate body 110. The outer surface of the intermediate body 110 refers to a surface of the intermediate body 110 away from a vehicle body. The first gap 130 has a width less than 10 mm.

The front protection device 100 according to this embodiment includes the intermediate body 110 and the fenders 120. Since the fenders 120 are detachably mounted at ends of the intermediate body 110, the fenders 120 and the intermediate body 110 may be separately packaged and transported during transportation, which can reduce the overall volume of the front protection device 100, and thus reduce the transportation difficulty. Meanwhile, when the front protection device 100 is damaged, only the corresponding components need to be replaced, and the product does not need to be integrally replaced, thereby reducing the maintenance cost. In addition, since the first gap 130 is formed between each of the fenders 120 and the outer surface of the intermediate body 110, when the vehicle body is impacted, the fenders 120 bear more impact energy, which can effectively damp the impact on the intermediate body 110, thereby improving the buffering and energy absorption effects of the front protection device 100 and protecting the safety of the vehicle body and users.

Figure 3:
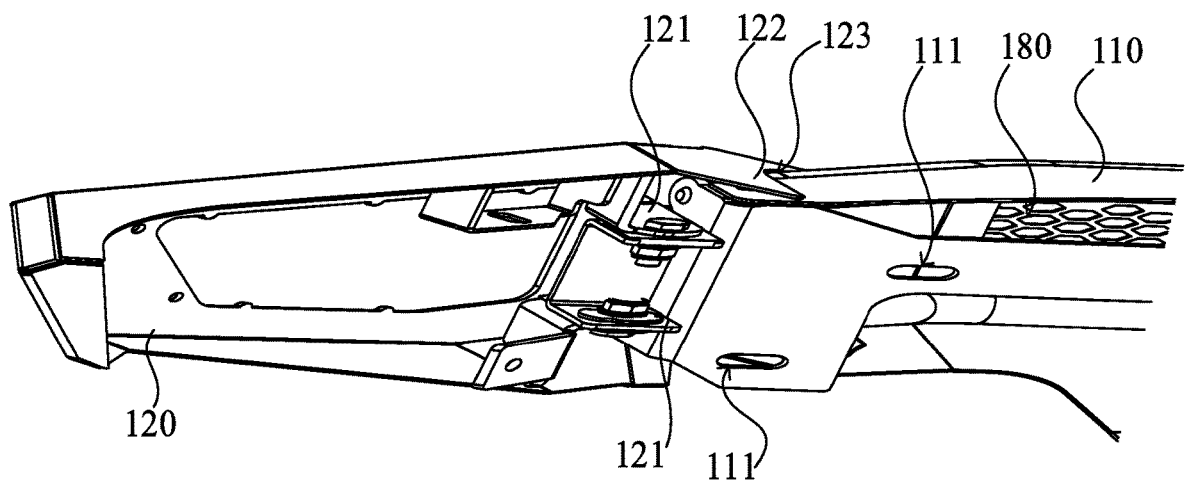
FIG. 3 is a schematic view of a fender in an unfolded position according to an embodiment of the present disclosure.
Figure 4:
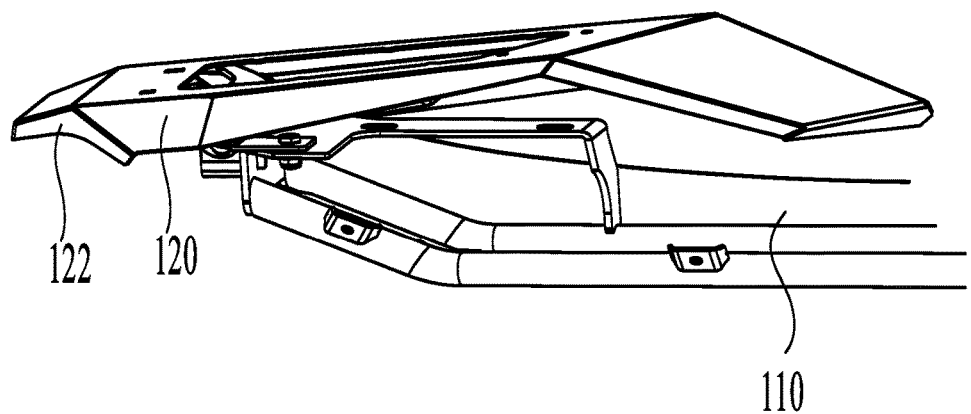
FIG. 4 is a schematic view of a fender in a folded position according to an embodiment of the present disclosure.

As an alternative embodiment, referring to FIGS. 3 to 4, each of the fenders 120 is provided with a first connecting portion 121. The first connecting portion 121 is rotatably connected to an end of the intermediate body 110. Each of the fenders 120 rotates about the first connecting portion 121 as an axis, so that each of the fenders 120 is in a folded position or in an unfolded position relative to the intermediate body 110. Specifically, the fender 120 is provided with the first connecting portion 121 at an end thereof for connecting to the intermediate body 110. The first connecting portion 121 is a bending sheet structure provided with a first screw hole (not shown). The intermediate body 110 is provided with a second screw hole (not shown) at an end thereof. A screw passes through the first screw hole and the second screw hole in sequence, and is screwed to an end of the screw with a nut, but the nut is not screwed tightly, so that the fender 120 can rotate about the first connecting portion 121 (or the screw passing through the first connecting portion 121) as the axis, so as to adjust the position of the fender 120 relative to the intermediate body 110. For example, the fender 120 rotates about the first connecting portion 121 to the folded position, or the fender 120 rotates about the first connecting portion 121 to the unfolded position (as shown in FIG. 3). The folded position (as shown in FIG. 4) refers to a position where the fenders 120 are attached to an inner surface of the intermediate body 110, and the inner surface of the intermediate body 110 refers to a surface of the intermediate body 110 facing the vehicle body. The unfolded position refers to a position where the fenders 120 adjoin the intermediate body 110 to form the whole front protection device 100 that can be mounted to the vehicle body. When the fenders 120 rotate to the unfolded position, the nuts and the screws can be tightened to ensure the stability of the front protection device 100, and then the front protection device 100 can be mounted to a head of the vehicle body.

Furthermore, referring to FIGS. 3 and 4, the fender 120 is provided with an engagement portion 122 at the end thereof. When the fender 120 rotates to the unfolded position, the engagement portion 122 is engaged to an edge of the intermediate body 110. Specifically, both sides of the fender 120 are each provided with a notch 123, thus forming the engagement portion 122. When the fender 120 rotates about the first connecting portion 121 as the axis to the unfolded position, the notches 123 of the engagement portion 122 is engaged to the edge of the intermediate body 110, so that the fender 120 cannot move any more, and the connection stability of the fender 120 and the intermediate body 110 is improved.

Furthermore, referring to FIG. 4, when the fender 120 rotates about the first connecting portion 121 as the axis to the folded position, the fender 120 and the intermediate body 110 may be fixed through screws. In this way, during transportation, the fenders 120 can be rotated to the folded position, and then the fenders 120 and the intermediate body 110 are fixed together through the screws. Therefore, during the transportation, it is ensured that the fenders 120 and the intermediate body 110 are prevented from being scratched, and it is beneficial to reduce the volume of the front protection device 100 and facilitate the transportation.

Figure 5:
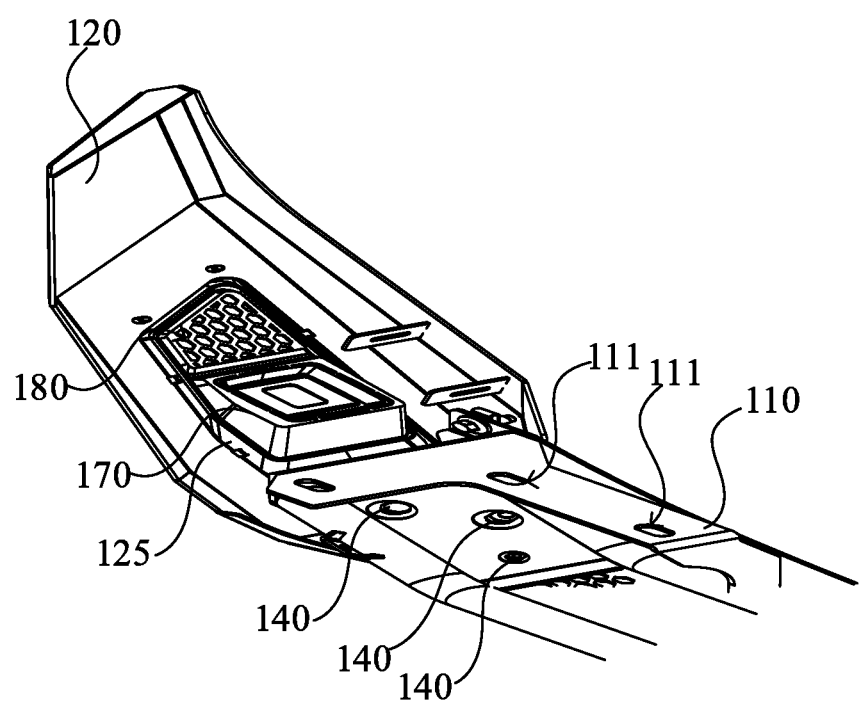
FIG. 5 is a schematic view of a fender connected to an intermediate body through a first fastener according to an embodiment of the present disclosure.

As another alternative embodiment, referring to FIG. 5, the front protection device 100 further includes first fasteners 140. The fenders 120 are mounted to the intermediate body 110 through the first fasteners 140. Specifically, the intermediate body 110 is provided with two waist-shaped holes 111 at an end thereof. The positions of the fender 120 corresponding to the waist-shaped holes 111 are provided with two screw holes. The first fasteners 140 sequentially pass through the screw holes and the waist-shaped holes 111 and are screwed by nuts, so that the fenders 120 and the intermediate body 110 can be fixedly connected. In general, circular holes are easy to process, and the waist-shaped holes are complex to process. However, when the machine is assembled, the mutual positions between some parts are difficult to reach the ideal positions or the positions between the parts need to be adjusted, the design of the waist-shaped hole is usually adopted. The positioning and fastening of the waist-shaped holes are also very simple, it is only necessary to additionally mount flat washers with the strength meeting the requirement. The positions of the waist-shaped holes 111 on the intermediate body 110 are more flexible. The manufacturer can flexibly select suitable positions at the end of the intermediate body 110 to form the waist-shaped holes 111 according to actual needs, and the screw holes on the fenders 120 need to be provided corresponding to the waist-shaped holes 111.

Figure 6:
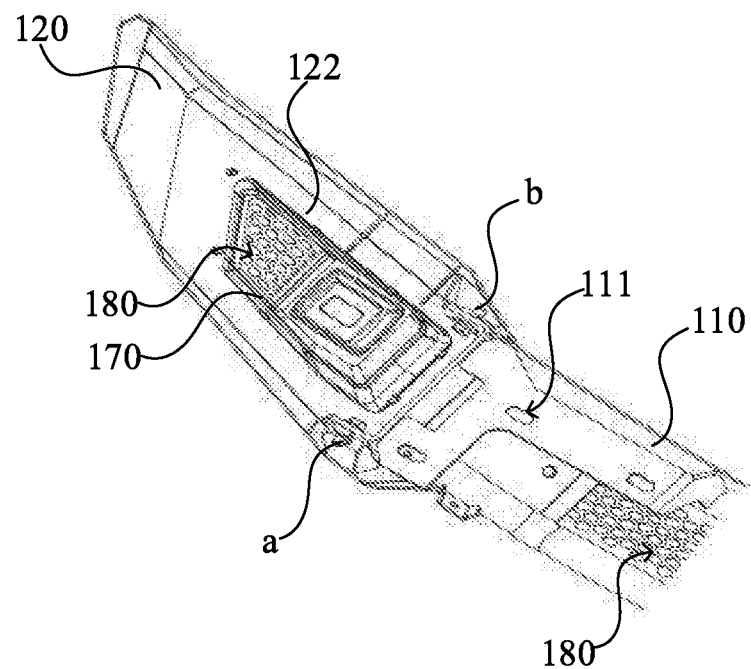
FIG. 6 is a schematic view of a fastening mode using a first fastener according to an embodiment of the present disclosure.

Hereinafter, taking two fastening modes as examples for illustration, the first fastening mode is shown in FIG. 6. A screw hole A (not shown) and a screw hole B (not shown) are provided at the end of the intermediate body 110 and are spaced apart from each other. One side wall of the fender 120 is provided with one screw hole corresponding to the screw hole A. A bolt a passes through the screw hole of the fender 120 and screw hole A on the intermediate body 110 in sequence to connect the fender 120 and the intermediate body 110. The other side wall of the fender 120 is also provided with one screw hole corresponding to the screw hole B. A bolt b passes through the screw hole of the fender 120 and screw hole A on the intermediate body 110 in sequence to connect the fender 120 and the intermediate body 110. In this way, the fender 120 and the intermediate body 110 can be fixedly connected.

Figure 7:
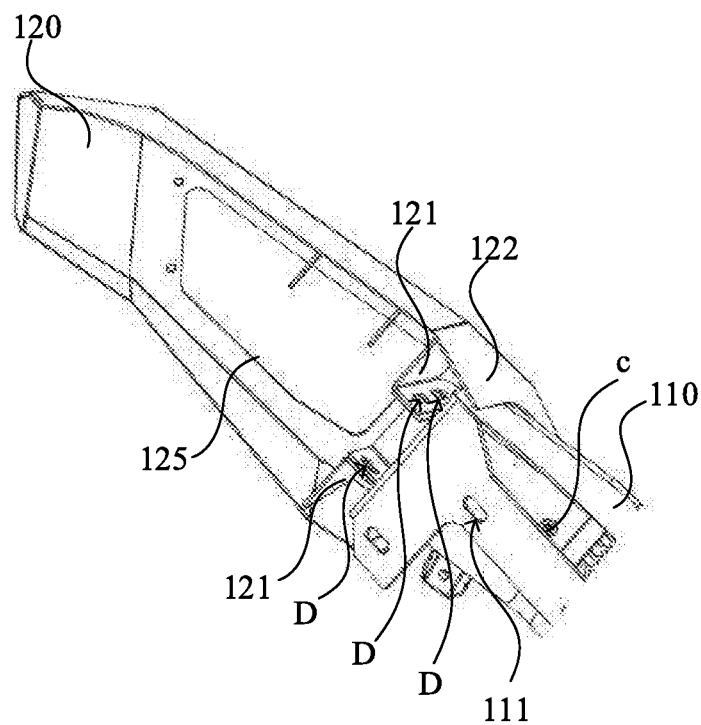
FIG. 7 is a schematic view of another fastening mode using a first fastener according to an embodiment of the present disclosure.

Another fastening mode is shown in FIG. 7, one screw hole is formed on the intermediate body 110, and the corresponding position of the fender 120 is also provided with one screw hole. A bolt c passes through these two screw holes to achieve the preliminary fixing of the fender 120 and the intermediate body 110. Two screw holes D are formed on the first connecting portion 121. The positions of the intermediate body 110 corresponding to the first connecting portion 121 are also provided with two screw holes, and bolts pass through the screw holes on the first connecting portion 121 and the intermediate body 110 in sequence to fixedly connecting the intermediate body 110 and the fender 120.

Furthermore, in order to further fix the fender 120 and the intermediate body 110, the first connecting portion 121 may also be threadedly connected to the intermediate body 110, thereby enhancing the stability of the front protection device 100. The first fasteners 140 may be fasteners such as bolts, screws, and the like. During transportation, the fenders 120 and the intermediate body 110 may be separately packaged and transported, which can reduce the overall volume of the front protection device 100, and thus reduce the transportation difficulty. Meanwhile, when the front protection device 100 is damaged, only the corresponding components need to be replaced, and the product does not need to be integrally replaced, thereby reducing the maintenance cost. When the front protection device 100 needs to be used, the fenders 120 and the intermediate body 110 are fastened and fixed only by the first fasteners 140.

Figure 8:
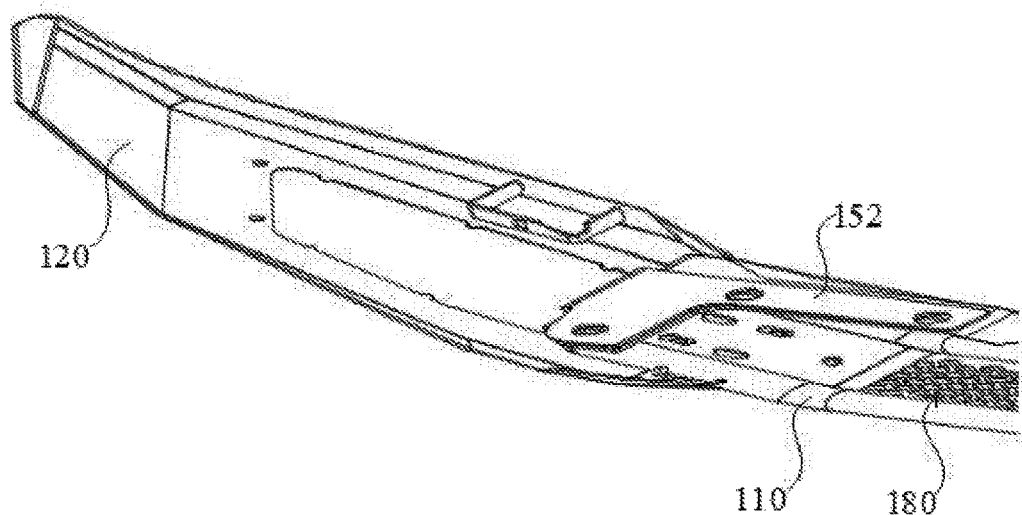
FIG. 8 is a schematic view of a fender connected to an intermediate body through an auxiliary mounting member according to an embodiment of the present disclosure.
Figure 9:
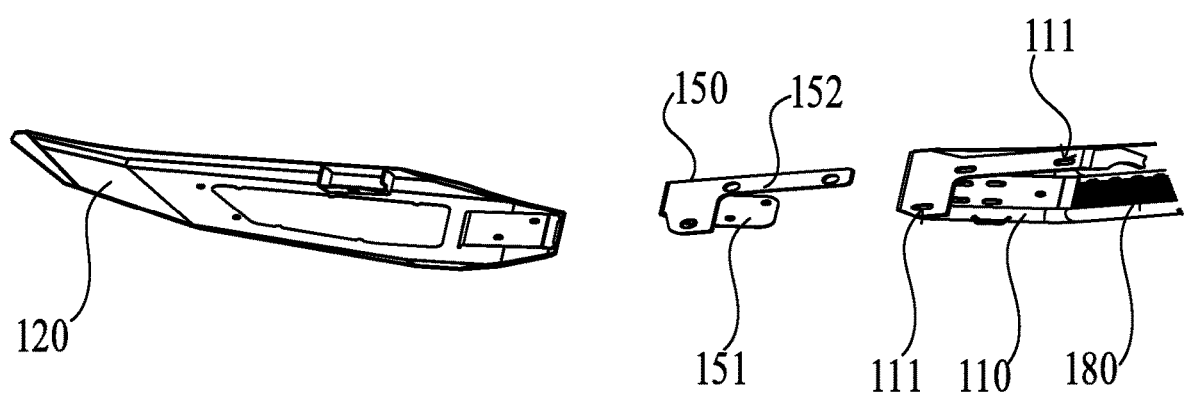
FIG. 9 is an exploded schematic view of the structure shown in FIG. 8.

As another alternative embodiment, referring to FIGS. 8 and 9, the front protection device 100 further includes auxiliary mounting members 150. Each of the auxiliary mounting members 150 is detachably mounted on the intermediate body 110, and the fender 120 is detachably connected to the auxiliary mounting member 150. Specifically, the auxiliary mounting member 150 is a bending metal sheet structure. The auxiliary mounting member 150 includes a first bending portion 151 and a second bending portion 152. When assembling the fender 120 and the intermediate body 110, it is only necessary to threadedly connect the first bending portion 151 to the fender 120 and threadedly connect the second bending portion 152 to the intermediate body 110. During transportation, the fenders 120 and the intermediate body 110 may be separately packaged and transported, which can reduce the overall volume of the front protection device 100, and thus reduce the transportation difficulty. Meanwhile, when the front protection device 100 is damaged, only the corresponding components need to be replaced, and the product does not need to be integrally replaced, thereby reducing the maintenance cost.

Figure 10:
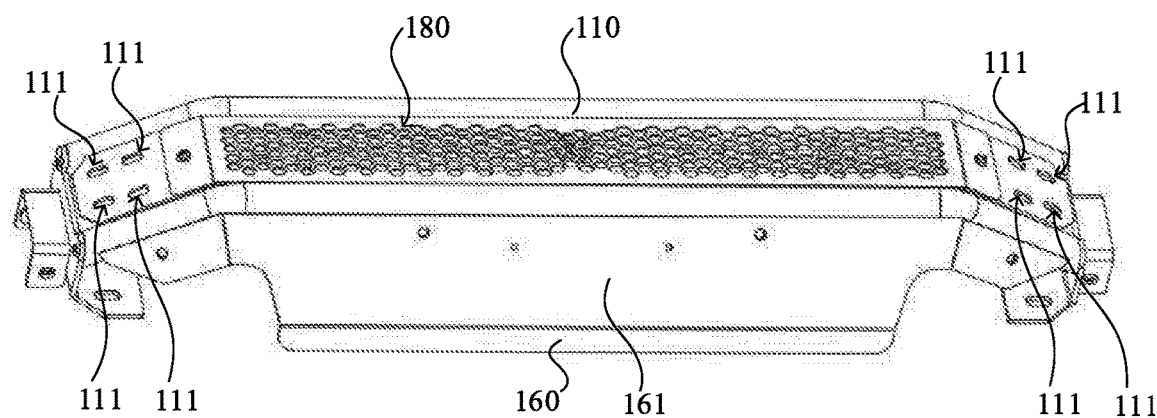
FIG. 10 is a schematic view of a front protection device according to an embodiment of the present disclosure.

In one embodiment, referring to FIG. 10, the front protection device 100 further includes a lower guard plate 160. The lower guard plate 160 is detachably mounted on the intermediate body 110. The lower guard plate 160 has a first area 161, and the first area 161 is used for providing a mark. Specifically, when the front protection device 100 is assembled, the lower guard plate 160 is mounted at a side of the front protection device 100 facing the ground, that is, the side of the intermediate body 110 facing the ground is used for providing the lower guard plate 160. The lower guard plate 160 is mounted on the intermediate body 110 through a plurality of sets of bolts or screws. The lower guard plate 160 serves to block the direct impact of the foreign matters such as stones on the vehicle body, which is beneficial to protect the vehicle body. Moreover, the lower guard plate 160 is provided with the first area 161, so that users can customize marks, patterns, etc. in the first area 161 as needed to achieve the personalized modification.

Figure 11:
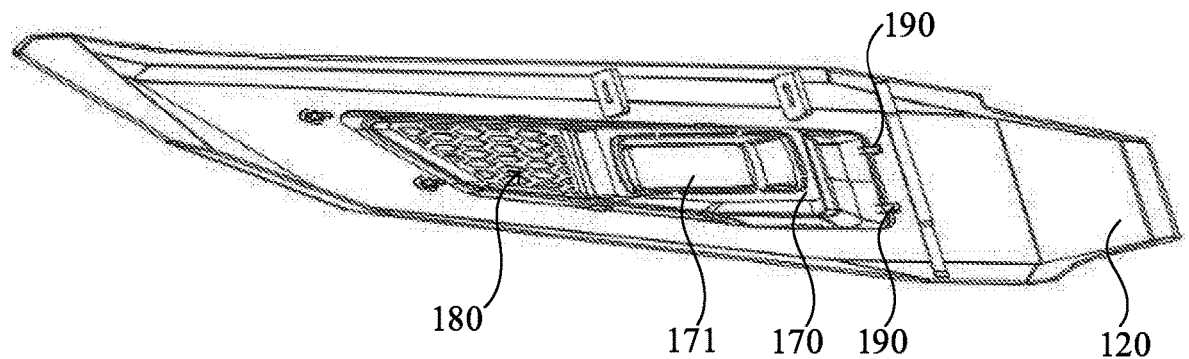
FIG. 11 is a schematic view of a fender according to an embodiment of the present disclosure.

In one embodiment, referring to FIGS. 1 and 5, the front protection device 100 is further provided with decorating members 125. The decorating members 125 are detachably mounted on the fenders 120. Specifically, the decorating members 125 may be plastic products or sheet metal products. The decorating members 125 are mounted on the fenders 120 through quick snap locks 190 (as shown in FIG. 11). Specifically, edges of the decorating members 125 are provided with the quick snap locks 190. The quick snap locks 190 are locked on the fenders 120.

Figure 12:
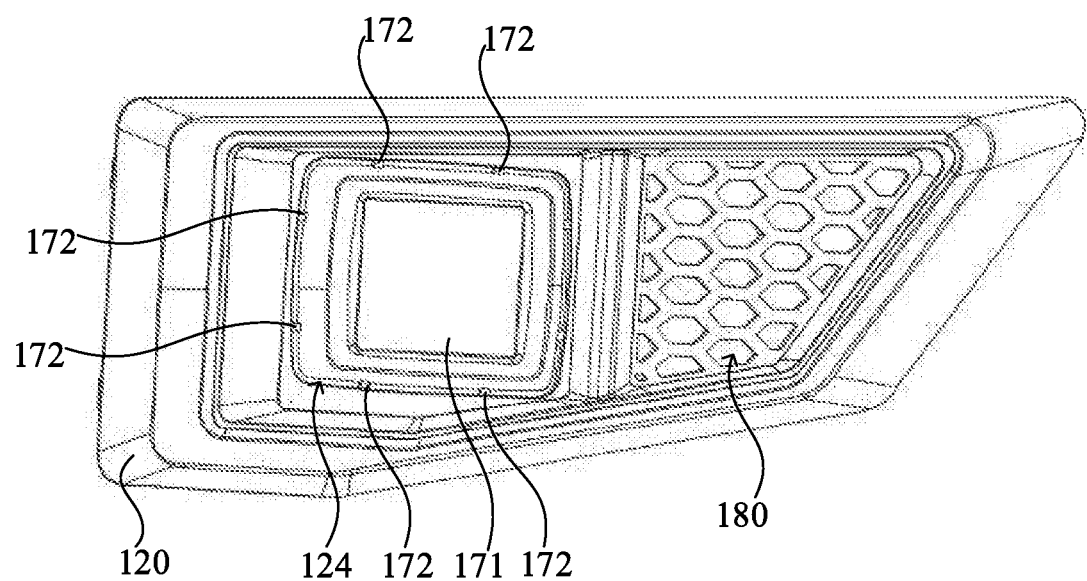
FIG. 12 is a schematic view of the fender viewed from a different perspective than FIG. 11 according to an embodiment of the present disclosure.

In one embodiment, referring to FIGS. 11 and 12, the front protection device 100 is further provided with lampshades 170. Each of the lampshades 170 is provided with a second area 171 for providing a mark. The fender 120 is provided with a first opening 124. The second area 171 is disposed in the first opening 124. The second area 171 is in a weak-connection with an inner wall forming the first opening 124. Specifically, users can customize marks, patterns, etc. in the second area 171 as needed to achieve the personalized modification. The weak-connection refers to that the connection between the lampshade 170 and the fender 120 is relatively weak, such that users can conveniently cut the lampshade according to their own intentions, and then mount other components. For example, the periphery of the second area 171 is connected to the inner wall forming the first opening 124 through a connecting strip 172. The connecting strip 172 has the advantage of being easily cut as a weak-connection manner. Users cut off the connecting strip 172 according to their own needs, and then take out the second area 171, and then additionally mount some parts such as LED lamps into the first opening 124 to achieve the free modification and meet different needs of the users. The connecting strip 172 may be made of materials such as plastics or metals.

In one embodiment, referring to FIGS. 9 to 12, shapes of the intermediate body 110 and the fenders 120 are matched with the vehicle body. The intermediate body 110 and the fenders 120 are provided with a plurality of mesh holes 180. Specifically, the contours of the intermediate body 110 and the fenders 120 are designed according to the vehicle body with which they are matched. The intermediate body 110 and the fenders 120 are provided with the plurality of mesh holes 180, which is beneficial to heat dissipation of the vehicle.

In one embodiment, referring to FIGS. 1 to 3, a vehicle includes a vehicle body and the front protection device 100 as described in any one of the above embodiments. The front protection device 100 is disposed on a head of the vehicle body for protecting the head of the vehicle body. In addition, since the first gap 130 is formed between the fender 120 and the outer surface of the intermediate body 110, when the vehicle body is impacted, the fenders 120 bear more impact energy, which can effectively damp the impact on the intermediate body 110, thereby improving the buffering and energy absorption effects of the front protection device 100 and protecting the safety of the vehicle body and users.

In one embodiment, referring to FIG. 1, a vehicle includes the front protection device 100 as described in any one of the above embodiments. Since the vehicle includes the front protection device 100 as described above, the technical effects are brought by the aforementioned front protection device 100, and the beneficial effects already include the beneficial effects of the front protection device 100, which is not described herein again. Moreover, the intermediate body and the fenders may be made of plastic or sheet metal parts. The sheet metal process is a comprehensive cold processing technology for metal sheets, including shearing, punching/cutting/compounding, folding, welding, riveting, splicing, forming (such as vehicle body), etc. The remarkable feature thereof is that the thickness of the same part is consistent. Products processed by the sheet metal process are called sheet metal parts. Since the sheet metal parts have the characteristics of light weight, high strength, electrical conductivity (capable of being used for electromagnetic shielding), low cost, large-scale mass production, good performance, and the like, the sheet metal parts have been widely used in the fields of electronic appliances, communications, automobile industry, medical equipment, and the like.

The front protection device 100 according to this embodiment includes the intermediate body 110 and the fenders 120. Since the fenders 120 are detachably mounted at ends of the intermediate body 110, the fenders 120 and the intermediate body 110 may be separately packaged and transported during transportation, which can reduce the overall volume of the front protection device 100, and thus reduce the transportation difficulty. Meanwhile, when the front protection device 100 is damaged, only the corresponding components need to be replaced, and the product does not need to be integrally replaced, thereby reducing the maintenance cost. In addition, since the first gap 130 is formed between each of the fenders 120 and the outer surface of the intermediate body 110, when the vehicle body is impacted, the fenders 120 bear more impact energy, which can effectively damp the impact on the intermediate body 110, thereby improving the buffering and energy absorption effects of the front protection device 100 and protecting the safety of the vehicle body and users.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. A front protection device, comprising:
an intermediate body having an outer surface and opposing first and second ends;
fenders respectively detachably coupled to the first and second ends, wherein first and second gaps are respectively formed between the first and second fenders and the outer surface, and wherein each of the fenders includes a fender opening formed by an inner wall; and
lampshades respectively including lampshade marking areas, wherein each of the lampshade marking areas is adapted to provide a lampshade mark, and wherein the lampshade marking areas are respectively disposed within the fender openings and coupled to the inner wall.

2. The front protection device according to claim 1, wherein each of the fenders includes a first connecting portion rotatably coupled to one of the first and second ends; and wherein each of the fenders is adapted to rotate about the first connecting portion between folded and unfolded positions relative to the intermediate body.

3. The front protection device according to claim 2, wherein each of the fenders includes an engagement portion at an end thereof,
wherein each of the engagement portions respectively engages an edge of the intermediate body when the fenders are disposed in the unfolded position.

4. The front protection device according to claim 1, further comprising fasteners adapted to couple the fenders to the intermediate body.

5. The front protection device according to claim 1, further comprising auxiliary mounting members detachably coupled to the intermediate body, wherein the fenders are respectively detachably coupled to the auxiliary mounting members.

6. The front protection device according to claim 1, further comprising a lower guard plate detachably coupled to the intermediate body, the lower guard plate having a lower guard plate area adapted to provide a lower guard plate mark.

7. The front protection device according to claim 1 further comprising decorating members respectively detachably coupled to the fenders.

8. The front protection device according to claim 1, wherein respective shapes of the intermediate body and the fenders substantially correspond with a vehicle body shape, and
wherein the intermediate body and the fenders each include mesh holes.

9. A vehicle comprising:
a vehicle body; and
a front protection device disposed on a head of the vehicle body, wherein the front protection device includes:
an intermediate body having opposing first and second ends; and
fenders respectively detachably coupled to the first and second ends of the intermediate body, respectively, wherein first and second gaps are formed between the first and second fenders and an outer surface of the intermediate body, and wherein each of the fenders includes a fender opening formed by an inner wall; and
lampshades respectively including lampshade marking areas, wherein each of the lampshade marking areas is adapted to provide a lampshade mark, and wherein the lampshade marking areas are respectively disposed within the fender openings and coupled to the inner walls.

* * * * *